United States Patent
Rapp et al.

(10) Patent No.: US 9,263,875 B2
(45) Date of Patent: Feb. 16, 2016

(54) DEVICE FOR ELECTRIC FIELD CONTROL

(71) Applicant: ABB Research Ltd., Zurich (CH)

(72) Inventors: Hans Rapp, Alingsas (SE); Ming Li, Vasteras (SE); Mikael Unge, Vasteras (SE); Uno Gafvert, Vasteras (SE); Markus Saltzer, Fislisbach (CH)

(73) Assignee: ABB Research Ltd., Zurich (CH)

( * ) Notice: Subject to any disclaimer, the term of this patent is extended or adjusted under 35 U.S.C. 154(b) by 114 days.

(21) Appl. No.: 14/148,347

(22) Filed: Jan. 6, 2014

(65) Prior Publication Data

US 2014/0116746 A1 May 1, 2014

Related U.S. Application Data

(63) Continuation of application No. PCT/EP2012/063041, filed on Jul. 4, 2012.

(60) Provisional application No. 61/504,342, filed on Jul. 5, 2011.

(51) Int. Cl.
*H02G 15/068* (2006.01)
*H02G 15/105* (2006.01)

(52) U.S. Cl.
CPC ............ *H02G 15/068* (2013.01); *H02G 15/105* (2013.01)

(58) Field of Classification Search
CPC .......................... H02G 15/068; H02G 15/105
USPC .......... 174/73.1, 650, 74 R, 77 R, 75 R, 88 R
See application file for complete search history.

(56) References Cited

U.S. PATENT DOCUMENTS

2003/0188885 A1    10/2003  Niinobe et al.
2004/0209025 A1*   10/2004  Kobayashi ............... B32B 1/08
                                                        428/34.9
(Continued)

FOREIGN PATENT DOCUMENTS

EP    0491091 A1    6/1992
EP    1870975 A1    12/2007
(Continued)

OTHER PUBLICATIONS

International Search Report & Written Opinion of the International Searching Authority Application No. PCT/EP2012/063041 Completed: Sep. 6, 2013; Mailing Date: Sep. 13, 2013 8 pages.
(Continued)

*Primary Examiner* — Hoa C Nguyen
*Assistant Examiner* — Amol Patel
(74) *Attorney, Agent, or Firm* — Whitmyer IP Group LLC

(57) ABSTRACT

A device for controlling an electric field at a high voltage component includes an inner deflector electrically connected to live voltage component; a resistive layer adapted for field control, arranged along the high voltage component, and electrically connected to the live high voltage component and electrically connected to a grounded part, the resistive layer having a nonlinear current-voltage characteristics; an insulating layer extending but ending without reaching the end of the resistive layer; and a semi-conducting or conducting layer arranged on the insulating layer and extending towards the resistive layer and past the end of the insulating layer, thereby defining an outer triple point at the intersection of the resistive layer, the insulating layer, and the semi-conducting or conducting layer. The resistive layer has first, second, and third adjacent sections, wherein a portion of the first section extends below the inner deflector.

27 Claims, 4 Drawing Sheets

(56) References Cited

U.S. PATENT DOCUMENTS

| | | | |
|---|---|---|---|
| 2006/0272842 A1* | 12/2006 | Vallauri | H02G 1/14 174/73.1 |
| 2010/0288527 A1* | 11/2010 | Lichy | H02G 15/068 174/73.1 |

FOREIGN PATENT DOCUMENTS

| | | |
|---|---|---|
| JP | H0731044 A | 1/1995 |
| JP | 2009542173 A | 11/2009 |
| WO | 0074191 A1 | 12/2000 |
| WO | 2007147755 A1 | 12/2007 |
| WO | 2008076058 A1 | 6/2008 |
| WO | 2013004748 A2 | 1/2013 |

OTHER PUBLICATIONS

First Office Action Application No. 2014-517791 Date: Feb. 24, 2015 pp. 4.

* cited by examiner

DEVICE FOR ELECTRIC FIELD CONTROL

FIELD OF THE INVENTION

The present invention generally relates to electric field control.

BACKGROUND OF THE INVENTION

There is known a device for controlling an electric field at a high voltage component comprising an inner deflector to be electrically connected to a live high voltage part of the high voltage component; a resistive layer adapted for field controlling purposes, to be arranged along the high voltage component, and which at one position is electrically connected to the inner deflector and at one end is adapted to be electrically connected to a grounded part of the high voltage component; an insulating layer arranged on the resistive layer and extending at least from the one position towards the one end of the resistive layer while ending without reaching the one end of the resistive layer; and a semi-conducting layer arranged on the insulating layer and extending at least from the one position towards the one end of the resistive layer and past the end of the insulating layer, thereby defining an outer triple point at the intersection of the resistive layer, the insulating layer, and the semi-conducting layer.

A device of this type is known through for instance WO 00/74191 A1. A device of this type is used for distributing the electric field where this is crucial and by that avoiding electric field concentrations and damaging of different type of equipment, such as cables. The electric potential between the live part and ground is distributed by means of a material with a suitable resistance forming the resistive layer. By combining the resistive field control and a suitable geometrical field control obtained through the insulating layer the risk of harmful charges building up and of high stresses upon the component, such as a cable, arising at rapid changes of the voltage thereof, is reduced with respect to such a device having only a resistive field control through a the resistive layer.

EP1870975 A discloses also a device of this type for controlling an electric field at a high voltage component, the device comprising a resistive layer for field control, an insulating layer arranged on the resistive layer and a semi-conducting or conducting layer arranged on the insulating layer. The three layers meet at a triple point, where the insulating layer ends. The interface between the resistive layer and the insulating layer makes in the triple point an angle to the semi-conducting or conducting layer of 60°-120°.

SUMMARY OF THE INVENTION

The rated voltage of HVDC (High Voltage Direct Current) equipment significantly increases and therefore, cable joints and terminations with corresponding voltage levels are required. By the term high voltage is referred to electric voltages of 36 kV and above, or often much higher such as hundreds of kV, such as e.g. above 300 kV and even above 500 kV.

The main challenge for DC equipment is the combined stress requirements of almost double nominal DC voltages and of DC voltages with superimposed transient voltages, like e.g. switching surges and lightning impulses. For the constant applied DC voltages the conductivity of the material is the dominating parameters. For transients additionally the permittivity needs to be taken into account. A worst case can be seen in the super position of a DC field and a fast transient of opposite polarity. Here extraordinary stress is achieved by superposition of space charge resistive and capacitive field distributions. This may lead to totally different stress distributions for transients and DC applied voltages, separately.

However, when using the known electric field control devices for voltages, in particular DC voltages, above a determined limit, which is depending on the material used for the different layers, the device will be damaged, thereby limiting the use of such a device with respect to the level of the high voltage.

It is therefore a purpose to provide an electric field control device, which may be used for higher voltages, in particular DC voltages, than such electric field control devices already known without being damaged.

In one aspect, a device for controlling an electric field at a high voltage component comprises an inner deflector to be electrically connected to a live high voltage part of the high voltage component; a resistive layer adapted for field controlling purposes, to be arranged along the high voltage component, and which at one position is to be electrically connected to the live high voltage part of the high voltage component and at one end is adapted to be electrically connected to a grounded part of the high voltage component; an insulating layer arranged on the resistive layer and extending at least from the one position towards the one end of the resistive layer while ending, e.g. by a tapered field control geometry, without reaching the one end of the resistive layer; and a semi-conducting or conducting layer arranged on the insulating layer and extending at least from the one position towards the one end of the resistive layer and past the end of the insulating layer, thereby defining an outer triple point at the intersection of the resistive layer, the insulating layer, and the semi-conducting or conducting layer. The resistive layer, which exhibits nonlinear current-voltage characteristics, has first, second, and third adjacent sections as seen from the one position towards the one end, wherein a portion of the first section extends below the inner deflector.

The electric field control device may comprise a connector, via which the inner deflector is to be electrically connected to the live high voltage part of the high voltage component, wherein the portion of the first section, which extends below the inner deflector, may be in contact with the connector only, with the inner deflector only, or with both the connector and the inner deflector. The portion of the first section, which extends below the inner deflector, may extend under the inner deflector, a considerable distance, such as e.g. at least under 10, 20, 30, or 40% of the extension of the inner deflector.

In another aspect, a device for controlling an electric field at a high voltage component comprises a resistive layer adapted for field controlling purposes, to be arranged along the high voltage component, and which at one position is adapted to be electrically connected to a live high voltage part of the high voltage component and at one end is adapted to be electrically connected to a grounded part of the high voltage component; an insulating layer arranged on the resistive layer and extending from the one position towards the one end of the resistive layer while ending, e.g. by a tapered field control geometry, without reaching the one end of the resistive layer; and a semi-conducting or conducting layer arranged on the insulating layer and extending from the one position towards the one end of the resistive layer and past the end of the insulating layer, thereby defining an outer triple point at the intersection of the resistive layer, the insulating layer, and the semi-conducting or conducting layer. The resistive layer, which exhibits a nonlinear current-voltage characteristics, has first, second, and third adjacent sections as seen from the one position towards the one end, wherein the third section is extending from the outer triple point to the one end; and the second section has a tapered field control geometry with, at least in a substantial portion thereof, a gradually increasing thickness in the direction towards the outer triple point.

In yet another aspect, a device for controlling an electric field at a high voltage component comprises a resistive layer adapted for field controlling purposes, to be arranged along the high voltage component, and which at one position is adapted to be electrically connected to a live high voltage part of the high voltage component and at one end is adapted to be electrically connected to a grounded part of the high voltage component; an insulating layer arranged on the resistive layer and extending from the one position towards the one end of the resistive layer while ending, e.g. by a tapered field control geometry, without reaching the one end of the resistive layer; and a semi-conducting or conducting layer arranged on the insulating layer and extending from the one position towards the one end of the resistive layer and past the end of the insulating layer, thereby defining an outer triple point at the intersection of the resistive layer, the insulating layer, and the semi-conducting or conducting layer. The resistive layer, which exhibits a nonlinear current-voltage characteristics, has first, second, and third adjacent sections as seen from the one position towards the one end, wherein the third section is extending from the outer triple point to the one end; and the third section has, at least in a portion thereof, a gradually decreasing thickness in the direction towards the one end.

The portion of the third section, in which the thickness is gradually decreasing in the direction towards the one end, may extend along a major part of the third section. Further, the rate of the thickness decrease may decrease in the direction towards the one end.

The above electric field control devices may provided for controlling an electric field at a high voltage component, which is rated 300 kV or higher, or optionally 500 kV or higher, and which optionally is a DC high voltage component.

The main tasks of the electric field control devices are for DC to provide interface grading and to avoid thermal runaway, for AC to keep the electric field below the bulk break down strength and the interface break down strength, and for transients of opposite polarity to keep the superimposed electric field below the bulk break down strength.

The electric field control devices disclosed in this document lower electric fields in critical locations, increase the break down strength in critical locations, and lower the dissipated power in critical locations.

Further characteristics and advantages will be evident from the following detailed description of embodiments given hereinafter and the accompanying FIGS. 1-7, which are given by way of illustration only, and are thus not limitative.

BRIEF DESCRIPTION OF THE DRAWINGS

Identical reference numerals are used throughout the Figures to denote identical or similar components, portions, details and the like of the various embodiments.

DETAILED DESCRIPTION OF THE INVENTION

Figure 1:
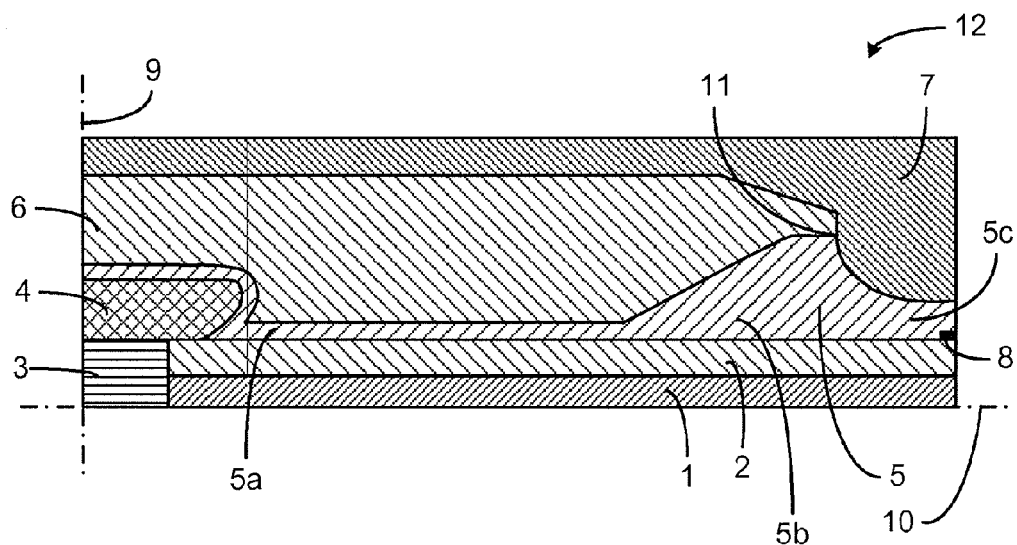
FIGS. 1-7 are each a schematic cross-sectional view of a cable joint provided with a device for controlling an electric field according to a respective embodiment.

FIG. 1 is a schematic cross-sectional view of a cable joint 12 provided with an electric field control device. The high voltage cable joint 12 comprises a high voltage cable consisting of a cable conductor 1, a cable insulator 2, and a semi-conducting ground layer 8, which are suitably prepared for the cable joint 12. A connector 3 is provided as a current connection device.

The electric field control device may comprise an inner deflector 4, a resistive field grading layer 5, an insulating layer 6, i.e. the joint insulation, and a semi-conducting layer 7, i.e. the mantle of the cable joint 12.

The inner deflector 4 is electrically connected to the cable conductor 1 of the high-voltage cable via the connector 3 during installation of the cable joint 12. To this end, the connector 3 is electrically conductive. The inner deflector 4 is electrically semi-conducting. The semi-conducting layer 7, e.g. the mantle of the cable joint 12 and the semi-conducting ground layer 8 may instead be of an electrically conducting material.

The resistive field grading layer 5 has nonlinear current-voltage characteristics and is adapted for field controlling purposes. During the fabrication of the cable joint 12, the resistive field grading layer 5 is arranged along the cable insulator 2 of the high-voltage cable and is at one end (to the right in FIG. 1) electrically connected to the semi-conducting ground layer 8 of the high-voltage cable. At one position (to the left in FIG. 1) the resistive field grading layer 5 is electrically connected to the inner deflector 4 and will hereby be electrically connected to the cable conductor 1 of the high-voltage cable.

The insulating layer 6 is arranged on the resistive field grading layer 5 and extends at least from the one position and towards the one end of the resistive field grading layer 5 while ending, e.g. by tapered field control geometry, without reaching the one end of the resistive field grading layer 5. The semi-conducting layer 7 is arranged on the insulating layer 6 and extends at least from the one position and towards the one end of the resistive field grading layer 5 and past the end of the insulating layer 6. Hereby, an outer triple point 11 can be defined at the intersection of the resistive field grading layer 5, the insulating layer 6, and the semi-conducting layer 7.

The semi-conducting ground layer 8 of the high-voltage cable may be electrically connected to the semi-conducting layer 7, e.g. at the right hand of FIG. 1.

The resistive field grading layer 5 has first 5a, second 5b, and third 5c adjacent sections as seen from the one position towards the one end of the resistive field grading layer 5 (from left to right in FIG. 1), wherein the third section 5c is extending from the outer triple point 11 to the one end of the resistive field grading layer 5.

A portion of the first section 5a of the resistive field grading layer 5 is in contact with, and extends below, the inner deflector 4 as can be seen in FIG. 1. The portion of the first section 5a, which extends below the inner deflector 4, is in this embodiment, however, not extending so long that it will come into contact with the connector 3.

As can be seen in FIG. 1 another portion of the first section 5a of the resistive field grading layer 5 may be in contact with, and extend above, the inner deflector 4.

The geometry of the resistive field grading layer 5 effectively prevents a superimposed field due to a DC field and transients of opposite polarity from becoming too high.

It shall be appreciated that the high voltage cable and the electric field control device may be cylinder symmetrical devices with a rotational symmetry axis 10 in a longitudinal direction. Each of the components of the high voltage cable and the electric field control device are rotation symmetric around the longitudinal symmetry axis 10.

Therefore, expressions such as arranged on, above and on top of may be understood as arranged outside or outside of, whereas arranged below and under may be understood as arranged inside or inside of.

Further, there is a mirror symmetry plane 9 in a radial direction (i.e. the normal vector of the plane is extending in an axial direction), in which the components of the high voltage cable and the electric field control device are mirrored to obtain the second high voltage cable of the cable joint 12 (to the left of the radial symmetry plane 9) and the components of the electric field control device, which are connected to that high voltage cable during fabrication of the cable joint 12.

Therefore, expressions such as a position, an end, and adjacent may be understood as a longitudinal position, a longitudinal end, and adjacent in the longitudinal direction.

Thus, during the fabrication of the cable joint 12, the inner deflector 4 is electrically connected to the cable conductor of the second high-voltage cable via the connector 3, the resistive field grading layer 5 is arranged along the cable insulator of the second high-voltage cable and is at a second end electrically connected to the semi-conducting ground layer of the second high-voltage cable. At a second position (to the left of the radial symmetry plane 9 in FIG. 1) the resistive field grading layer 5 is electrically connected to the inner deflector 4 and will hereby be connected to the cable conductor 1 of the high-voltage cable.

The insulating layer 6 is arranged on the resistive field grading layer 6 and extends at least from the second position and towards the second end of the resistive field grading layer 5 while ending, e.g. by tapered field control geometry, without reaching the second end of the resistive field grading layer 5. The semi-conducting layer 7 is arranged on the insulating layer 6 and extends at least from the second position and towards the second end of the resistive field grading layer 5 and past the end of the insulating layer 6, which does not reach the second end of the resistive field grading layer 5. Hereby, a second outer triple point can be defined at the intersection of the resistive field grading layer 5, the insulating layer 6, and the semi-conducting layer 7 at the second high voltage cable.

The resistive field grading layer 5 has fourth, fifth, and sixth adjacent sections as seen from the second position and towards the second end of the resistive field grading layer 5 (not illustrated), wherein a portion of the fourth section is in contact with, and extends below, the inner deflector 4.

It shall be appreciated, that in the following each of the cable joints 12 will be described only with references to the parts illustrated FIGS. 1-5. A person skilled in the art realizes that the devices can be rotation symmetric around the longitudinal symmetry axis 10 and mirrored in the radial symmetry plane 9.

The second section 5b of the resistive field grading layer 5 may have a tapered field control geometry with a gradually increasing thickness in the direction towards the outer triple point 11, whereas the first section 5a of the resistive field grading layer 5 may be a thin uniform layer of a substantially constant thickness. The gradually increasing thickness in the direction towards the outer triple point 11 may exist in the entire or at least in a substantial part of the second section 5b of the resistive field grading layer 5.

As compared to prior art devices, the resistive field grading layer 5 is locally diminished in the first section 5a and in the portion of the second section 5b closest to the first section 5a. Hereby, the resistive losses of the resistive field grading layer 5 are lowered, thereby limiting the heat production.

Further, by reducing the thickness of the resistive field grading layer 5 to obtain a thin layer possibly covering the inner deflector 4 an additional capacitive/refractive field grading effect, due to the higher permittivity of the material of the resistive field grading layer 5 as compared to the surrounding material, is obtained. The use of the higher epsilon for fast transients is obtained by the combination of the non-linear resistive grading with the refractive/capacitive field grading.

Further, the third section 5c of the resistive field grading layer 5 may have, at least in a substantial portion thereof, a gradually decreasing thickness in the direction towards the one end of the resistive field grading layer 5.

The portion of the third section 5c, in which the thickness is gradually decreasing in the direction towards the one end of the resistive field grading layer 5, may extend along a major part of the third section 5c, preferably from the outer triple point 11 to a position where the end of the semi-conducting ground layer 8 of the high-voltage cable is located. The thickness decrease is preferably curved. Above the semi-conducting ground layer 8 of the high-voltage cable the thickness of the third section 5c is preferably constant, whereby the constant can as well become zero, i.e. the resistive layers vanishes in direction of the semi-conducting ground layer 8.

The rate of the thickness decrease may be decreasing in the direction towards the one end. Also the higher derivatives of the thickness as a function of distance in the direction towards the one end may be negative.

The thickness t may gradually decrease in the direction towards the one end of the resistive field grading layer 5 approximately according to $$t = C_1 e^{-c_2 x},$$

where $C_1$ and $C_2$ are constants and x is the longitudinal distance from the outer triple point 11.

Alternatively, the thickness may decrease approximately according to a functional form, which may be approximated, e.g. by a geometric series form:

$$t = Ax^{-1} + Bx^{-2} + Cx^{-3} + \ldots$$

where A, B, C, . . . are constants.

Still alternatively, the thickness may decrease approximately according to a functional form, which may be approximated by:

$$T = c_1 * \exp[c_2/(1-x/c_3)] \text{ or}$$

$$T = -c_1 * \text{sqrt}((1-(x/c_2)^2) + c_3$$

where $C_1$, $C_2$ and $C_3$ are constants and x is the longitudinal distance from the outer triple point 11.

Yet alternatively, the thickness may increase from right to left approximately according to a polynomial.

By the wedge or stress cone like surface shape of the resistive field grading layer 5 in the third section 5c, the distance between the outer triple point 11 and the semi-conducting ground layer 8 is increased, thereby influencing the axial electric field in the interfaces between the cable insulation 2 and the resistive field grading layer 5 and between the resistive field grading layer 5 and the joint insulation 6. It needs to extend a certain length in order to sufficiently distribute the electric field in the axial direction.

Further, the first section 5a of the resistive field grading layer 5 may have a maximum thickness, which is smaller than a minimum thickness of the second section 5b of the resistive field grading layer 5, and the resistive field grading layer 5 may be thickest at the outer triple point 11.

Figure 2:
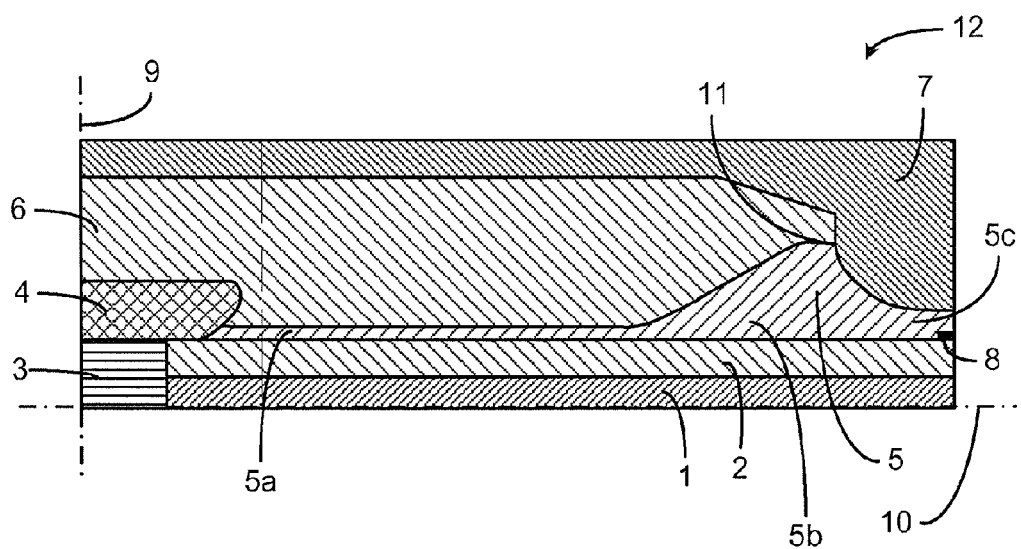

FIG. 2 is a schematic cross-sectional view of a cable joint 12 provided with an electric field control device, which differs from the electric field control device of FIG. 1 in that the radially extending end side and the upper side of the inner deflector is not covered by the resistive field grading layer 5. Instead, the insulating layer 6 is in contact with, and extends at the radially extending end side and on top of, the inner deflector 4.

The field grading material of the resistive field grading layer 5 introduces space charge fields. By means of omitting the resistive field grading layer 5 on top of the inner deflector, the space charge field at a critical location such as at the inner deflector 4 is decreased.

Another alternative is to provide an electric field control device, which differs from the electric field control device of FIG. 1 in that the radially extending end side and the upper side of the inner deflector is only partly covered by the resistive field grading layer 5, i.e. the resistive field grading layer 5 fade out on top of the inner deflector 4.

Figure 3:
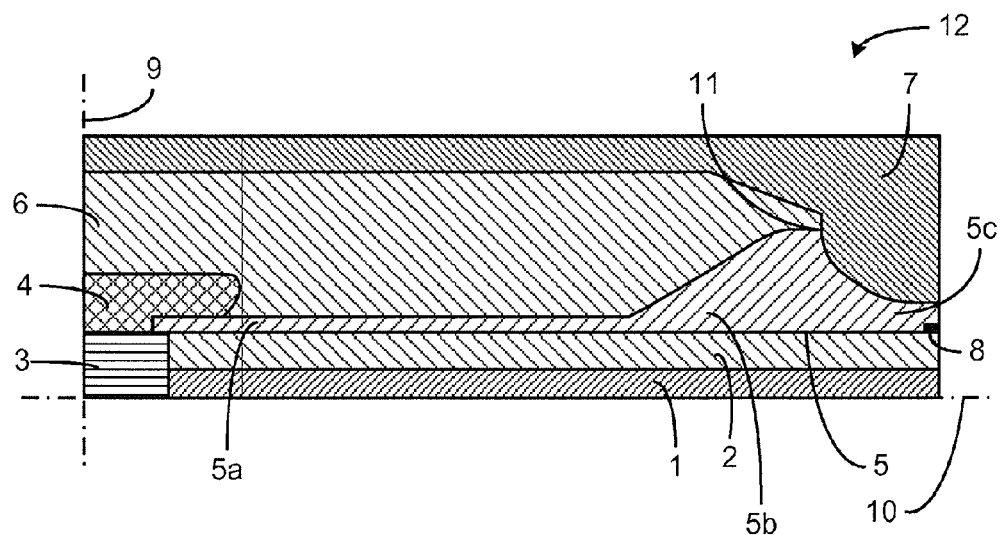

FIG. 3 is a schematic cross-sectional view of a cable joint 12 provided with an electric field control device, which differs from the electric field control device of FIG. 2 in that the portion of the first section 5a of the resistive field grading layer 5, which extends below the inner deflector 4, is extending further to be in contact with, and arranged partly on top of, the connector 3.

By such provisions a low risk of electric break down is obtained.

Figure 4:
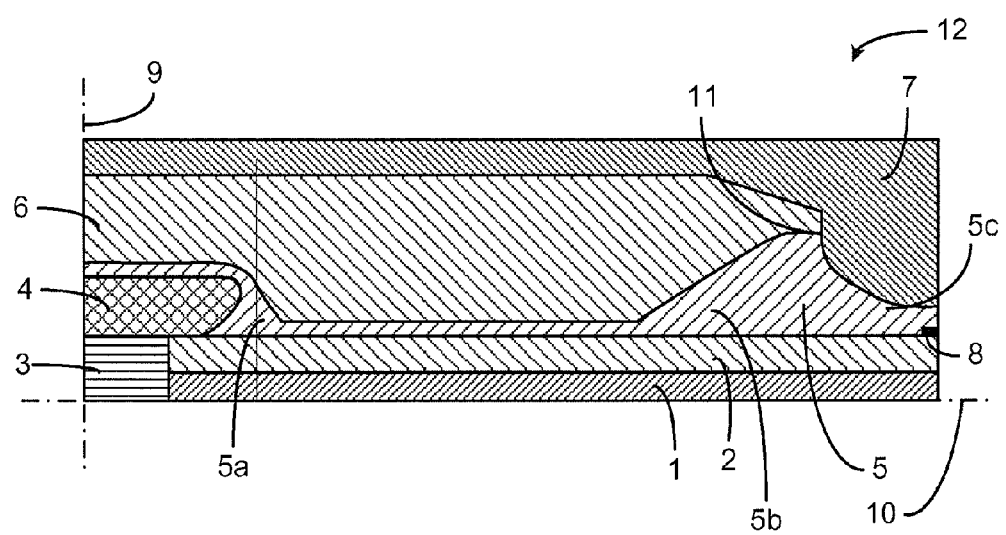

FIG. 4 is a schematic cross-sectional view of a cable joint 12 provided with an electric field control device, which differs from the electric field control device of FIG. 1 in that a portion of the first section 5a of the resistive field grading layer 5 has a gradually decreasing thickness in the direction towards the second section 5b, wherein this portion is located at an end of the inner deflector 4. Hereby, any sharp edge of the resistive field grading layer 5 is avoided, and instead a smooth upper surface of the resistive field grading layer 5 is obtained as can be seen in FIG. 4.

By means of the FIG. 4 shape of the resistive field grading layer the electric field due to a DC field and occurring transients can be kept below the bulk break down strength.

Figure 5:
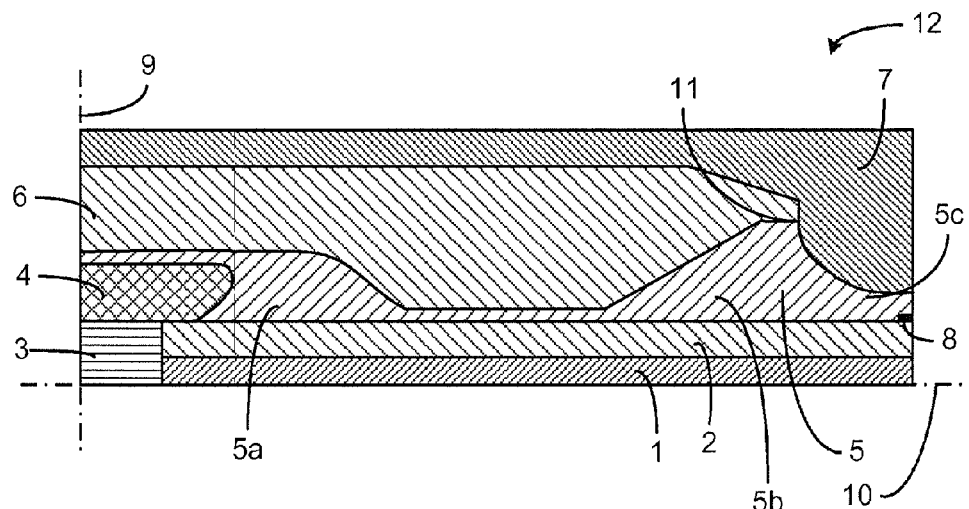

FIG. 5 is a schematic cross-sectional view of a cable joint 12 provided with an electric field control device, which differs from the electric field control device of FIG. 1 in that a portion of the first section 5a of the resistive field grading layer 5 has a gradually decreasing thickness in the direction towards the second section 5b, wherein this portion is located at a distance from the radially extending end side of the inner deflector 4 in the direction towards the second section 5b The electric field control device of FIG. 5 is easier and simpler, and thus cheaper, to manufacture as compared to the other illustrated electric field control devices.

Figure 6:
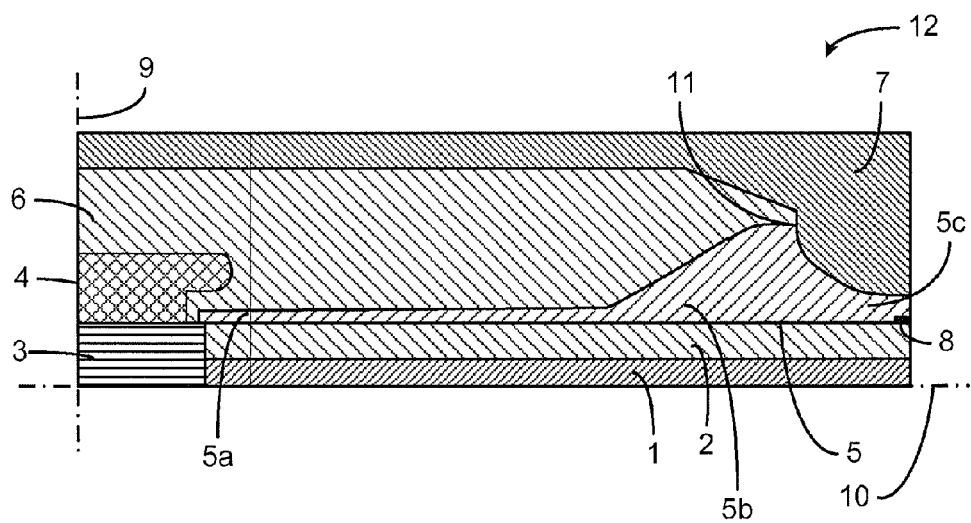

FIG. 6 is a schematic cross-sectional view of a cable joint 12 provided with an electric field control device, which differs from the electric field control device of FIG. 1 in that both a portion of the first section 5a of the resistive field grading layer 5 and a portion of the insulating layer 6 extend below the inner deflector 4. The portion of the first section 5a of the resistive field grading layer 5 does not extend to the inner deflector 4, but is only in contact with the connector 3.

Figure 7:
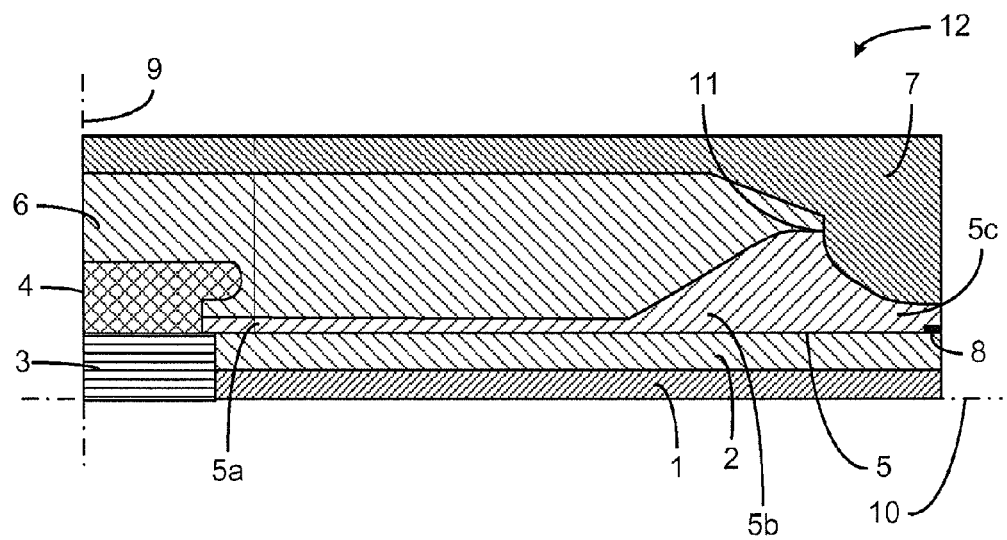

FIG. 7 is a schematic cross-sectional view of a cable joint 12 provided with an electric field control device, which differs from the electric field control device of FIG. 6 in the portion of the first section 5a of the resistive field grading layer 5 extends to the inner deflector 4, and is thus in contact with the connector 3 and the inner deflector 4.

It shall be appreciated that the resistive layer 5 instead may extend between the connector 3 and the inner deflector 4 all the way to the mirror symmetry plane 9.

Yet alternatively, the resistive layer 5 may extend on top of the connector 3 all the way to the mirror symmetry plane 9 and the inner deflector 4 may be dispensed with.

In each of the embodiments the inner deflector may be dispensed with, or may alternatively be made of an insulating material, i.e. the same material as the insulating layer 6 is made of.

The high voltage cable joints 12 may carry an alternating voltage or a direct voltage.

Generally, the electric field control devices can be used at various high voltage components such as cable joints, cable terminations, and cable connections, but also as bushings in switchgears and vacuum breakers. Here, no mirror symmetry as illustrated in the drawings is necessary. Axially, the entire device is illustrated in the drawings.

Advantageously, the electric field control devices disclosed above may be provided for controlling an electric field at a high voltage component, which is rated 300 kV or higher, or optionally 500 kV or higher, and which optionally is a DC high voltage component.

The invention is not in any way restricted to the embodiments described above, but a large variety of modifications thereof would be apparent to a person with ordinary skill in the art without departing from the basic idea of the invention as defined in the appended claims.

It shall further be appreciated that the various features disclosed in claims depending on a main claim may additionally be combined in a similar manner with the features of another main claim.

What is claimed is:

1. A device for controlling an electric field at a high voltage component comprising:
   an inner deflector to be electrically connected to a live high voltage part of the high voltage component;
   a resistive layer adapted for field controlling purposes, to be arranged along said high voltage component, and which at one position is to be connected to the live high voltage part of the high voltage component and at one end is adapted to be electrically connected to a grounded part of the high voltage component, the resistive layer having a nonlinear current-voltage characteristics;
   an insulating layer arranged on said resistive layer and extending at least from said one position towards said one end of the resistive layer while ending without reaching said one end of the resistive layer; and
   a semi-conducting or conducting layer arranged on the insulating layer and extending at least from said one position towards said one end of the resistive layer and past the end of the insulating layer, thereby defining an outer triple point at the intersection of the resistive layer, the insulating layer, and the semi-conducting or conducting layer, characterized in that
   the resistive layer has first, second, and third adjacent sections as seen from said one position towards said one end, wherein
   a portion of the first section extends below said inner deflector; and
   said insulating layer is in contact with, and extends above, said inner deflector.

2. The device of claim 1, wherein the first section has a maximum thickness, which is smaller than a minimum thickness of the second section.

3. The device of claim 2, wherein the first section is a thin uniform layer of a substantially constant thickness.

4. The device of claim 1 comprising a connector, via which said inner deflector is to be electrically connected to said live high voltage part of the high voltage component.

5. The device of claim 4 wherein said portion of the first section, which extends below said inner deflector, is in contact with said connector only, with said inner deflector only, or with both the connector and the inner deflector.

6. The device of claim 4 wherein a portion of said insulating layer (6) extends below said inner deflector.

7. The device of claim 1 wherein
the third section is extending from the outer triple point to said one end; and
the second section has at least in a substantial part thereof tapered field control geometry with a gradually increasing thickness in the direction towards the outer triple point.

8. The device of claim 1 wherein the third section has, at least in a substantial portion thereof, a gradually decreasing thickness in the direction towards said one end.

9. The device of claim 8 wherein the portion of the third section, in which the thickness is gradually decreasing in the direction towards said one end, extends from the outer triple point to the end of a ground part of the high voltage component.

10. The device of claim 8 wherein the rate of the thickness decrease is decreasing in the direction towards said one end.

11. The device of claim 1 wherein the resistive layer is thickest at the outer triple point.

12. The device of claim 1 wherein
said device is arranged for controlling an electric field at a further high voltage component;
said inner deflector is to be electrically connected to a live high voltage part of the further high voltage component;
said resistive layer is to be arranged along said further high voltage component, and which at one further position is to be electrically connected to said live high voltage part of the further high voltage component and at one other end is adapted to be electrically connected to a grounded part of the further high voltage component;
said insulating layer is extending at least from said one further position towards said one other end of the resistive layer while ending without reaching said one other end of the resistive layer;
said semi-conducting or conducting layer arranged on the insulating layer and extending at least from said one further position towards said one other end of the resistive layer and past the end of the insulating layer, which does not reach said one other end of the resistive layer, thereby defining a further outer triple point at an intersection of the resistive layer, the insulating layer, and the semi-conducting or conducting layer;
the resistive layer has fourth, fifth, and sixth adjacent sections as seen from said one further position towards said one other end, wherein
a portion of the fourth section extends below said inner deflector.

13. The device of claim 12 wherein
the high voltage component and the further high voltage component are each a high voltage cable; and
said device is provided for jointing the high voltage cables in a cable joint.

14. The device of claim 1 wherein
the high voltage component is a high voltage cable, switchgear, or a vacuum breaker; and
said device is provided for terminating said high voltage cable in a cable termination or for being used as a bushing.

15. The device of claim 1 wherein said device is provided for controlling an electric field at a high voltage component, which is rated 300 kV or higher, or optionally 500 kV or higher, and which optionally is a DC high voltage component.

16. A device for controlling an electric field at a high voltage component comprising:
an inner deflector to be electrically connected to a live high voltage part of the high voltage component;
a resistive layer adapted for field controlling purposes, to be arranged along said high voltage component, and which at one position is to be connected to the live high voltage part of the high voltage component and at one end is adapted to be electrically connected to a grounded part of the high voltage component, the resistive layer having a nonlinear current-voltage characteristics;
an insulating layer arranged on said resistive layer and extending at least from said one position towards said one end of the resistive layer while ending without reaching said one end of the resistive layer; and
a semi-conducting or conducting layer arranged on the insulating layer and extending at least from said one position towards said one end of the resistive layer and past the end of the insulating layer, thereby defining an outer triple point at the intersection of the resistive layer, the insulating layer, and the semi-conducting or conducting layer, characterized in that
the resistive layer has first, second, and third adjacent sections as seen from said one position towards said one end, wherein
a portion of the first section extends below said inner deflector; and
a portion of the first section has a gradually decreasing thickness in the direction towards the second section.

17. The device of claim 16, wherein the portion of the first section, which has a gradually decreasing thickness, is located at an end of the inner deflector.

18. The device of claim 16 wherein the portion of the first section, which has a gradually decreasing thickness, is located at a distance from an end of the inner deflector in the direction towards the second section.

19. The device of claim 16 wherein another portion of the first section is in contact with, and extends above, said inner deflector.

20. The device of claim 16 wherein said insulating layer is in contact with, and extends above, said inner deflector.

21. The device of claim 16 comprising a connector, via which said inner deflector is to be electrically connected to said live high voltage part of the high voltage component.

22. The device of claim 16 wherein
said device is arranged for controlling an electric field at a further high voltage component;
said inner deflector is to be electrically connected to a live high voltage part of the further high voltage component;
said resistive layer is to be arranged along said further high voltage component, and which at one further position is to be electrically connected to said live high voltage part of the further high voltage component and at one other end is adapted to be electrically connected to a grounded part of the further high voltage component;
said insulating layer is extending at least from said one further position towards said one other end of the resistive layer while ending without reaching said one other end of the resistive layer;
said semi-conducting or conducting layer arranged on the insulating layer and extending at least from said one further position towards said one other end of the resistive layer and past the end of the insulating layer, which does not reach said one other end of the resistive layer, thereby defining a further outer triple point at an intersection of the resistive layer, the insulating layer, and the semi-conducting or conducting layer;

the resistive layer has fourth, fifth, and sixth adjacent sections as seen from said one further position towards said one other end, wherein a portion of the fourth section extends below said inner deflector.

23. The device of claim 22 wherein the high voltage component and the further high voltage component are each a high voltage cable; and said device is provided for jointing the high voltage cables in a cable joint.

24. The device of claim 16 wherein the high voltage component is a high voltage cable, switchgear, or a vacuum breaker; and said device is provided for terminating said high voltage cable in a cable termination or for being used as a bushing.

25. The device of claim 16 wherein said device is provided for controlling an electric field at a high voltage component, which is rated 300 kV or higher, or optionally 500 kV or higher, and which optionally is a DC high voltage component.

26. A device for controlling an electric field at a high voltage component comprising:

a resistive layer adapted for field controlling purposes, to be arranged along said high voltage component, and which at one position is adapted to be electrically connected to a live high voltage part of the high voltage component and at one end is adapted to be electrically connected to a grounded part of the high voltage component, the resistive layer having a nonlinear current-voltage characteristics;

an insulating layer arranged on said resistive layer and extending from said one position towards said one end of the resistive layer while ending without reaching said one end of the resistive layer; and a semi-conducting or conducting layer arranged on the insulating layer and extending from said one position towards said one end of the resistive layer and past the end of the insulating layer, thereby defining an outer triple point at the intersection of the resistive layer, the insulating layer, and the semi-conducting or conducting layer, characterized in that the resistive layer has first, second, and third adjacent sections as seen from said one position towards said one end, wherein the third section is extending from the outer triple point to said one end; and the second section has at least in a substantial part thereof tapered field control geometry with a gradually increasing thickness in the direction towards the outer triple point.

27. A device for controlling an electric field at a high voltage component comprising:

a resistive layer adapted for field controlling purposes, to be arranged along said high voltage component, and which at one position is adapted to be electrically connected to a live high voltage part of the high voltage component and at one end is adapted to be electrically connected to a grounded part of the high voltage component, the resistive layer having a nonlinear current-voltage characteristics;

an insulating layer arranged on said resistive layer and extending from said one position towards said one end of the resistive layer while ending without reaching said one end of the resistive layer; and a semi-conducting or conducting layer arranged on the insulating layer and extending from said one position towards said one end of the resistive layer and past the end of the insulating layer, thereby defining an outer triple point at the intersection of the resistive layer, the insulating layer, and the semi-conducting or conducting layer, characterized in that the resistive layer has first, second, and third adjacent sections as seen from said one position towards said one end, wherein the third section is extending from the outer triple point to said one end; and the third section has, at least in a substantial portion thereof, a gradually decreasing thickness in the direction towards said one end.

* * * * *